(12) United States Patent
Satou (10) Patent No.: US 10,724,912 B2
(45) Date of Patent: Jul. 28, 2020

(54) SENSOR DEVICE

(71) Applicant: FANUC CORPORATION, Yamanashi (JP)

(72) Inventor: Kazuhiro Satou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 15/641,703

(22) Filed: Jul. 5, 2017

(65) Prior Publication Data

US 2018/0017455 A1 Jan. 18, 2018

(30) Foreign Application Priority Data

Jul. 13, 2016 (JP) .................... 2016-138148

(51) Int. Cl.
  *G01L 5/22* (2006.01)
  *G01L 1/14* (2006.01)
  *G01L 1/22* (2006.01)

(52) U.S. Cl.
  CPC ............. *G01L 5/226* (2013.01); *G01L 1/14* (2013.01); *G01L 1/2275* (2013.01)

(58) Field of Classification Search
  CPC .......... G01L 5/226; G01L 1/14; G01L 1/2275
  See application file for complete search history.

(56) References Cited

U.S. PATENT DOCUMENTS 8,649,906 B2 * 2/2014 Bischoff .............. B25J 13/085
                                                      700/258
2014/0331787 A1 11/2014 Brookhuis et al.
2016/0025529 A1 1/2016 Astegher et al.
2016/0339948 A1 * 11/2016 Nakamura ............... B62D 1/04

(Continued)

FOREIGN PATENT DOCUMENTS

| CN | 103930757 A | 7/2014 |
|---|---|---|
| DE | 102006055849 A1 | 5/2008 |
| DE | 102007063099 A1 | 7/2009 |

(Continued)

OTHER PUBLICATIONS

English Abstract and Machine Translation for Japanese Publication No. 2010-014695 A, published Jan. 21, 2010, 19 pgs.

(Continued)

*Primary Examiner* — Leslie J Evanisko
*Assistant Examiner* — Leo T Hinze
(74) *Attorney, Agent, or Firm* — Fredrikson & Byron, P.A.

(57) ABSTRACT

A sensor device includes a plurality of systems each having a sensor element, and a computation unit configured to calculate as a first value a value of at least one of a force and a moment applied to a detection target in a predetermined axial direction, based on a detection signal detected by the sensor element, and an abnormality determining unit configured to compare the first values calculated by the computation units of the systems with one another, and determine that there is an abnormality if a difference of the first value is greater than or equal to a predetermined amount. The computation unit of at least one of the systems calculates as a second value a value of at least one of a force and a moment applied to the detection target in the axial direction, based on detection signals detected by the sensor elements of the systems.

9 Claims, 2 Drawing Sheets

(56) References Cited

U.S. PATENT DOCUMENTS

2019/0039643 A1* 2/2019 Oka ..................... B62D 5/0463

FOREIGN PATENT DOCUMENTS

| DE | 102012006629 A1 | 10/2012 |
|----|-----------------|---------|
| JP | 201014695 A | 1/2010 |
| JP | 201581013 A | 4/2015 |
| JP | 5853121 B1 | 2/2016 |
| JP | 2017167024 A | 9/2017 |
| WO | 2015145638 A1 | 10/2015 |
| WO | 2015151535 A1 | 10/2015 |

OTHER PUBLICATIONS

English Abstract and Machine Translation for Japanese Publication No. 5853121 B1, published Feb. 9, 2016, 68 pgs.

English Abstract and Machine Translation for Japanese Publication No. 2015-081013 A, published Apr. 27, 2015, 17 pgs.

English Abstract and Machine Translation for Japanese Publication No. 2017-167024 A, published Sep. 21, 2017, 21 pgs.

English Machine Translation of Decision to Grant issued by the Japan Patent Office (JPO) in Japanese Application No. 2016-138148, dated Oct. 9, 2018, 3 pages.

Untranslated Decision to Grant issued by the Japan Patent Office (JPO) in Japanese Application No. 2016-138148, dated Oct. 9, 2018, 3 pages.

English Machine Translation of Notification of Reasons for Refusal issued by the Japan Patent Office (JPO) in Japanese Application No. 2016-138148, dated Jun. 5, 2018, 3 pages.

Untranslated Notification of Reasons for Refusal issued by the Japan Patent Office (JPO) in Japanese Application No. 2016-138148, dated Jun. 5, 2018, 4 pages.

English Abstract and Machine Translation for International Publication No. WO2015/151535 A1, published Oct. 8, 2015, 11 pgs.

English Abstract and Machine Translation for Chinese Publication No. 103930757 A, published Jul. 16, 2014, 30 pgs.

English Abstract and Machine Translation for German Publication No. 102007063099 A1, published Jul. 2, 2009, 13 pgs.

English Machine Translation for German Publication No. 102012006629 A1, published Oct. 11, 2012, 20 pgs.

English Abstract and Machine Translation for German Publication No. 102006055849 A1, published May 29, 2008, 10 pgs.

English Abstract and Machine Translation for International Publication No. 2015145638 A1, published Oct. 1, 2015, 25 pgs.

\* cited by examiner

SENSOR DEVICE

CROSS-REFERENCE TO RELATED APPLICATION

This application is based upon and claims the benefit of priority from Japanese Patent Application No. 2016-138148 filed on Jul. 13, 2016, the contents of which are incorporated herein by reference.

BACKGROUND OF THE INVENTION

Field of the Invention

The present invention relates to a sensor device configured to detect at least one of an external force and a moment applied to a detection target.

Description of the Related Art

As a means for detecting an external force or a moment applied to a detection target such as a robot or the like, a strain gauge type of sensor and a capacitance type of sensor, etc., have been used. A capacitance type of sensor is superior to a strain gauge type of sensor in terms of ease of manufacturing and cost, however, because changes in the electrostatic capacitance value with respect to the applied force are nonlinear, a problem results in that the detection accuracy is low.

Below, principles of detection using a capacitance type of sensor will briefly be described. Upon application of an external force, corresponding to the external force, a distortion is generated in a housing in which a pair of electrodes (two electrodes) that make up the capacitance type of sensor are installed, whereupon the distance between the electrode pair (the distance between the electrodes) changes depending on the distortion. Because the electrostatic capacitance value (detection value) changes corresponding to the distance between the electrodes, by measuring the detection value, it is possible to calculate an external force or a moment applied to the detection target.

In this instance, the relationship between the external force and the distortion of the housing in which the electrode pair is installed is linear, and the relationship between the distortion of the housing in which the electrode pair is installed and the distance between the electrodes also is linear. However, the relationship between the distance between the electrodes and the detection value (electrostatic capacitance value) is nonlinear. If the two electrodes that make up the electrode pair are in parallel, and the distance between the electrodes is kept sufficiently smaller than the electrode area, the electrostatic capacitance value becomes inversely proportional to the distance between the electrodes. On the other hand, if the conditions of a parallel-plate capacitor are not satisfied, such as in the case that the two electrodes are not in parallel but are inclined to one another, the electrostatic capacitance value cannot be expressed simply by an inversely proportional relationship.

As a method for determining an external force and moment, etc., from measured values, there is generally known a method in which a model function is assumed, which is indicative of a relationship between a detected detection value, and an external force and moment applied to a detection target. In this case, using the model function, the external force and moment are determined from the detection value. Such a model function is represented by a function containing one or more unknown parameters.

Below, a description will be made as an example of a model function of a first order polynomial, which is one general type of model function. As a specific example thereof, there may be considered a case in which external forces and moments are detected by six sensor elements (capacitance type sensor elements), and based on detection values from the six sensor elements, external forces and moments in six axial directions are determined.

When the detection values of the six sensor elements are represented by a six-dimensional vector, the following equation (1) is obtained. Further, when the external forces and moments to be determined are represented by a six-dimensional vector, the following equation (2) is obtained.

$$v=[v_1, \ldots, v_6]^T \quad (1)$$

$$f=[f_1, \ldots, f_6]^T \quad (2)$$

If the unknown parameters are represented by a 6×6 matrix, as shown in equation (3), the model function for the external force and moment can be expressed by the following equation (4).

$$C = \begin{bmatrix} C_{1,1} & \cdots & C_{1,6} \\ \vdots & \ddots & \vdots \\ C_{6,1} & \cdots & C_{6,6} \end{bmatrix} \quad (3)$$

$$f = C \cdot v \quad (4)$$

In order to determine the values of each of the parameters of the matrix C, which is represented by the numerical formula (3), forces and moments of a plurality of patterns (1, ..., N) are applied to the detection target, and values detected by the sensor elements are acquired. The acquired plurality of items of data are expressed by (fi, vi), where i=1, ..., N. The values of the respective parameters of the matrix C are determined on the basis of the acquired plurality of items of data (fi, vi). In general, the respective parameters of the matrix C are determined by a predetermined criterion such as minimization of a squared error (least squares method) or the like. For example, in the case that each of the parameters is determined by the least squares method, the respective parameters of the matrix C are determined such that the term cm in the following equation (5) is minimized.

$$cm = \Sigma_{i=1}^{N}(f_i - C \cdot v_i)^2 \quad (5)$$

In Japanese Laid-Open Patent Publication No. 2010-014695, it is disclosed that, in a strain gauge type of multi-axis sensor, detection accuracy is improved by taking the average of detection values from duplicatively arranged detection units. More specifically, taking into consideration an interference error between axes (interference error with other axes) as a cause of worsening in accuracy, and by arranging the sensor elements symmetrically for each group, the interference errors with other axes are generated symmetrically between the groups, and the average of the detection values is taken, whereby the interference errors with other axes are canceled out.

SUMMARY OF THE INVENTION

However, in the conventional technique, since there is a limit to the relationship between inputs and outputs that can be expressed by a model function, errors occur between the actually applied external forces and moments, and the external forces and moments which are calculated by the model function. In particular, in the event that the relationship between the external force and the detection value is nonlinear, as in a capacitance type of sensor, the influence of such errors becomes large.

Further, all of the errors that occur in detection values detected by sensors are not necessarily distributed symmetrically among groups, as discussed above, and thus with the technique of Japanese Laid-Open Patent Publication No. 2010-014695, it is not possible to cope effectively with errors that occur asymmetrically. In particular, in the case of capacitance type sensor elements, since it cannot be guaranteed that errors due to nonlinearity will be generated symmetrically between groups, accuracy is further deteriorated in the event that capacitance type sensor elements are used.

Thus, an object of the present invention is to provide a sensor device in which errors are reduced between actually applied external forces and moments, and forces and moments determined based on detection values detected by sensor elements.

An aspect of the present invention is characterized by a sensor device including a plurality of systems each having a sensor element configured to detect at least one of an external force and a moment applied to a detection target, and a computation unit configured to calculate as a first value a value of at least one of a force and a moment applied to the detection target in a predetermined axial direction, based on a detection signal detected by the sensor element, and an abnormality determining unit configured to compare the first value calculated by the computation unit of each of the plurality of systems with one another, and to determine that there is an abnormality if a difference of the first value is greater than or equal to a predetermined amount, wherein the computation unit of at least one system of the plurality of systems calculates as a second value a value of at least one of a force and a moment applied to the detection target in the axial direction, based on a plurality of detection signals detected by the respective sensor elements of the plurality of systems.

In accordance with the above configuration, at least one of a force and a moment applied to the detection target in an axial direction is calculated as a second value, based on detection signals detected by sensor elements of a plurality of systems, and therefore, the detection accuracy of the sensor device is improved. Stated otherwise, it is possible to reduce errors between actually applied external forces and moments, and forces and moments determined based on detection signals detected by the sensor elements. In addition, it is possible to accurately determine whether or not the sensor device is operating normally.

In the sensor device according to the aspect of the present invention, each of the plurality of systems may include a plurality of sensor elements, and the computation unit of each of the plurality of systems may calculate values of at least one of a force and a moment in a plurality of axial directions. In accordance with this feature, the computation units can obtain the first values and the second values in a plurality of axial directions. Accordingly, the sensor device is capable of detecting at least forces or moments in a plurality of axial directions.

In the sensor device according to the aspect of the present invention, the computation unit of each of the plurality of systems may include a first storage medium in which there is stored first conversion characteristic information for converting the detection signal detected by the sensor element of its own system into the first value, and the computation unit of at least one system of the plurality of systems may further include a second storage medium in which there is stored second conversion characteristic information for converting the detection signals detected by the respective sensor elements of the plurality of systems into the second value. In accordance with this feature, the computation units can calculate the first values and the second values with high accuracy.

In the sensor device according to the aspect of the present invention, the computation unit of each of the plurality of systems is capable of communicating mutually with each other, and may receive from the computation unit of another one of the systems the detection signal detected by the sensor element of the other system. In accordance with this feature, the computation units of the respective systems are each capable of acquiring a detection signal detected by the sensor element of another system, and using it to calculate the second value.

In the sensor device according to the aspect of the present invention, each of the plurality of systems may include a converter configured to convert the detection signal detected by the sensor element into a digital signal, and the converter of each of the plurality of systems may output the detection signal that was converted into a digital signal, to the computation units of the plurality of systems. In accordance with this feature, the computation units of the respective systems are each capable of acquiring a detection signal detected by the sensor element of another system, and using it to calculate the second value.

In the sensor device according to the aspect of the present invention, the abnormality determining unit may include a plurality of abnormality determining units which are provided corresponding respectively to the plurality of systems. In accordance with this feature, it is possible to determine whether or not the sensor device is operating normally for each of the systems.

According to the present invention, at least one of a force and a moment applied to the detection target in an axial direction is calculated as a second value, based on detection signals detected by sensor elements of a plurality of systems, and therefore, the detection accuracy of the sensor device is improved. Stated otherwise, it is possible to reduce errors between actually applied external forces and moments, and forces and moments determined based on detection signals detected by the sensor elements. In addition, it is possible to accurately determine whether or not the sensor device is operating normally.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a sensor device according to the present invention will be presented and described in detail below with reference to the accompanying drawings.

Figure 1:
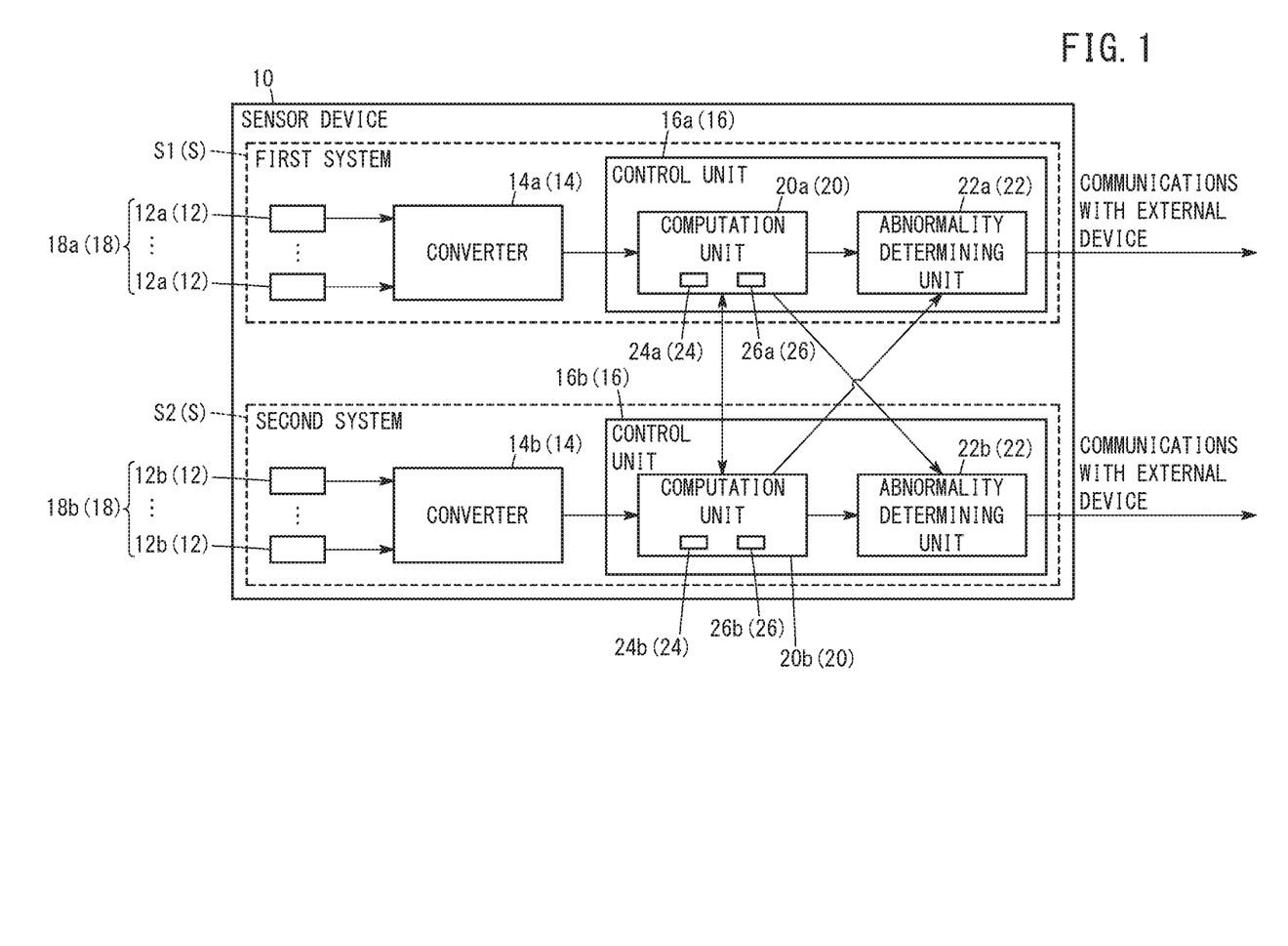
FIG. 1 is a view showing a configuration of a sensor device according to an embodiment of the present invention.

FIG. 1 is a view showing a configuration of a sensor device 10 according to an embodiment of the present invention. The sensor device 10 is equipped with two systems S each having a plurality of (N individual) sensor elements 12, a converter 14, and a control unit 16. The plural sensor elements 12 of each of the sensors S constitute a multi-axis sensor 18. The sensor elements 12 may be capacitance type sensor elements or strain gauge type sensor elements, or may be other types of sensor elements apart therefrom.

In order to distinguish the sensor elements 12, the converters 14, and the control units 16 of the two systems S from each other, the sensor elements 12, the converter 14, and the control unit 16 of one of the systems (first system) S1 are denoted by 12a, 14a, and 16a, whereas the sensor elements 12, the converter 14, and the control unit 16 of the other of the systems (second system) S2 are denoted by 12b, 14b, and 16b. Further, the multi-axis sensor 18 of the first system S1 is denoted by 18a, whereas the multi-axis sensor 18 of the second system S2 is denoted by 18b.

The multi-axis sensor 18a (made up of a plurality of (N individual) sensor elements 12a) of the first system S1, and the multi-axis sensor 18b (made up of a plurality of (N individual) sensor elements 12b) of the second system S2 are sensor elements for the purpose of detecting external forces and moments of a predetermined plurality of axial directions, which are applied mutually to the same location (hereinafter referred to as a "detection target") of a robot.

Each of the converters 14 (14a, 14b) of the respective systems S (S1, S2) is connected electrically through connection lines with the plurality of sensor elements 12 (12a, 12b) and the control unit 16 (16a, 16b) of its own system S (S1, S2). Stated otherwise, the converter 14a is connected electrically with the plurality of sensor elements 12a and the control unit 16a, whereas the converter 14b is connected electrically with the plurality of sensor elements 12b and the control unit 16b.

In order to simplify and facilitate the description, in the sensor device 10 of the present embodiment, the number N of sensor elements 12a of the first system S1, and the number N of sensor elements 12b of the second system S2 are assumed to be six each, and the six respective sensor elements 12a, 12b of each system are used to determine external forces and moments in six axial directions. The forces and moments of the six axial directions are defined as a force in an X-axis direction, a force in a Y-axis direction, a force in a Z-axis direction, a moment about the X-axis, a moment about the Y-axis, and a moment about the Z-axis. The number of sensor elements 12 of each of the systems S, and the number of axes for which forces and moments are determined need not necessarily be the same.

A plurality (N=6) of detection signals (detection values) detected by the multi-axis sensor 18a of the first system S1, which is constituted from the plurality (N=6) of sensor elements 12a, are output to the converter 14a of the first system S1. The converter 14a converts the plurality (N=6) of detection signals detected by the multi-axis sensor 18a into digital signals. Let $u_1, \ldots, u_6$ be the plurality (N=6) of detection signals (detection values) which are converted into digital signals by the converter 14a. The converter 14a outputs the detection signals $u_1, \ldots, u_6$ of the converted plurality (N=6) of digital signals to the control unit 16a of the first system S1. Assuming that the plurality (N=6) of detection signals (digital signals) $u_1, \ldots, u_6$ detected by the multi-axis sensor 18a are represented by a six (=N) dimensional vector U, the following equation (6) is obtained.

$$U=[u_1, \ldots, u_N]^T=[u_1, u_2, u_3, u_4, u_5, u_6]^T \quad (6)$$

Similarly, a plurality (N=6) of detection signals (detection values) detected by the multi-axis sensor 18b of the second system S2, which is constituted from the plurality (N=6) of sensor elements 12b, are output to the converter 14b of the second system S2. The converter 14b converts the plurality (N=6) of detection signals detected by the multi-axis sensor 18b into digital signals. Let $v_1, \ldots, v_6$ be the plurality (N=6) of detection signals (detection values) which are converted into digital signals by the converter 14b. The converter 14b outputs the detection signals $v_1, \ldots, v_6$ of the converted plurality (N=6) of digital signals to the control unit 16b of the second system S2. Assuming that the plurality (N=6) of detection signals (digital signals) $v_1, \ldots, v_6$ detected by the multi-axis sensor 18b are represented by a six (=N) dimensional vector V, the following equation (7) is obtained.

$$V=[v_1, \ldots, v_N]^T=[v_1, v_2, v_3, v_4, v_5, v_6]^T \quad (7)$$

Each of the control units 16 (16a, 16b) of the systems S (S1, S2) includes a processor such as a CPU or the like, and a storage medium in which a program is stored, and by the processors executing the programs, the processors function as the control units 16 (16a, 16b) according to the present embodiment. Each of the control units 16 of the systems S includes a computation unit 20 and an abnormality determining unit 22. In order to distinguish the computation units 20 and the abnormality determining units 22 of the two systems S from each other, the computation unit 20 and the abnormality determining unit 22 of the first system S1 are denoted by 20a and 22a, whereas the computation unit 20 and the abnormality determining unit 22 of the second system S2 are denoted by 20b and 22b. The control unit 16a of the first system S1 and the control unit 16b of the second system S2 are capable of communicating mutually with each other. The control units 16a, 16b may carry out communications wirelessly, or the control unit 16a and the control unit 16b may be connected by a communications line (over wires), and communications therebetween may be carried out through the communications line.

On the basis of the plurality of detection signals (digital signals) $u_1, \ldots, u_6$ detected by the multi-axis sensor 18a of the first system S1, the computation unit 20a calculates values (hereinafter also referred to as first values) of the forces and moments of the predetermined plurality (N=6) of axial directions, which are applied to the detection target. In this instance, $f^U_1, \ldots, f^U_6$ are taken to represent the values of the forces and moments of the plurality (N=6) of axial directions which are calculated by the computation unit 20a. Assuming that the plurality (N=6) of first values $f^U_1, \ldots, f^U_6$ computed (calculated) by the computation unit 20a are represented by a six (=N) dimensional vector $F^U$, the vector $F^U$ can be expressed by the following equation (8).

$$F^U=[f^U_1, \ldots, f^U_N]^T=[f^U_1, f^U_2, f^U_3, f^U_4, f^U_5, f^U_6]^T \quad (8)$$

Similarly, on the basis of the plurality of detection signals (digital signals) $v_1, \ldots, v_6$ detected by the multi-axis sensor 18b of the second system S2, the computation unit 20b calculates values (hereinafter also referred to as first values) of the forces and moments of the predetermined plurality (N=6) of axial directions, which are applied to the detection target. In this instance, $f^V_1, \ldots, f^V_6$ are taken to represent the values of the forces and moments of the plurality (N=6) of axial directions which are calculated by the computation unit 20b. Assuming that the plurality (N=6) of first values $f^V_1, \ldots, f^V_6$ computed (calculated) by the computation unit 20b are represented by a six (=N) dimensional vector $F^V$, the vector $F^V$ can be expressed by the following equation (9).

$$F^V=[f_1^V, \ldots, f_N^V]^T=[f_1^V,f_2^V,f_3^V,f_4^V,f_5^V,f_6^V]^T \quad (9)$$

According to the present embodiment, $f^U_1$ and $f^V_1$ indicate forces in the X-axis direction, $f^U_2$ and $f^V_2$ indicate forces in the Y-axis direction, and $f^U_3$ and $f^V_3$ indicate forces in the Z-axis direction. Further, $f^U_4$ and $f^V_4$ indicate moments around the X-axis, $f^U_5$ and $f^V_5$ indicate moments around the Y-axis, and $f^U_6$ and $f^V_6$ indicate moments around the Z-axis.

If the plurality of parameters (first conversion characteristic information) $c^U$ for obtaining the vector $F^U$ from the vector U are expressed in the form of an N×N matrix (conversion matrix) $C^U$ (where N=6) as indicated by the following equation (10), $F^U$, $C^U$, and U can be represented by a relational expression (model function) as indicated by the following equation (11).

$$C^U = \begin{bmatrix} C^U_{1,1} & \cdots & C^U_{1,N} \\ \vdots & \ddots & \vdots \\ C^U_{N,1} & \cdots & C^U_{N,N} \end{bmatrix} = \begin{bmatrix} C^U_{1,1} & \cdots & C^U_{1,6} \\ \vdots & \ddots & \vdots \\ C^U_{6,1} & \cdots & C^U_{6,6} \end{bmatrix} \quad (10)$$

$$F^U = C^U \cdot U \quad (11)$$

Similarly, if the plurality of parameters (first conversion characteristic information) $c^V$ for obtaining the vector $F^V$ from the vector V are expressed in the form of an N×N matrix (conversion matrix) $C^V$ (where N=6) as indicated by the following equation (12), $F^V$, $C^V$, and V can be represented by a relational expression (model function) as indicated by the following equation (13).

$$C^V = \begin{bmatrix} C^V_{1,1} & \cdots & C^V_{1,N} \\ \vdots & \ddots & \vdots \\ C^V_{N,1} & \cdots & C^V_{N,N} \end{bmatrix} = \begin{bmatrix} C^V_{1,1} & \cdots & C^V_{1,6} \\ \vdots & \ddots & \vdots \\ C^V_{6,1} & \cdots & C^V_{6,6} \end{bmatrix} \quad (12)$$

$$F^V = C^V \cdot V \quad (13)$$

Accordingly, by using equations (6), (8), (10) and (11), the computation unit 20a is capable of determining the plurality of first values $f^U_1, \ldots, f^U_6$ on the basis of the plurality of detection signals (digital signals) $u_1, \ldots, u_6$ detected by the multi-axis sensor 18a (plurality of sensor elements 12a). Similarly, by using equations (7), (9), (12) and (13), the computation unit 20b is capable of determining the plurality of first values $f^V_1, \ldots, f^V_6$ on the basis of the plurality of detection signals (digital signals) $v_1, \ldots, v_6$ detected by the multi-axis sensor 18b (plurality of sensor elements 12b).

The plurality of parameters $c^U$ of the matrix $C^U$ are stored in the storage medium (first storage medium) 24 of the computation unit 20a of the first system S1, and the plurality of parameters $c^V$ of the matrix $C^V$ are stored in the storage medium (first storage medium) 24 of the computation unit 20b of the second system S2. In this case as well, in order to distinguish the storage media 24 of the two systems S from each other, the storage medium 24 of the first system S1 is denoted by 24a, whereas the storage medium 24 of the second system S2 is denoted by 24b.

The computation unit 20a outputs the calculated first values $f^U_1, \ldots, f^U_6$ to the abnormality determining unit 22a of its own system (first system S1), and together therewith, transmits the calculated first values $f^U_1, \ldots, f^U_6$ to the abnormality determining unit 22b of the other system (second system) S2. The computation unit 20b outputs the calculated first values $f^V_1, \ldots, f^V_6$ to the abnormality determining unit 22b of its own system (second system S2), and together therewith, transmits the calculated first values $f^V_1, \ldots, f^V_6$ to the abnormality determining unit 22a of the other system (first system) S1. Further, the computation unit 20a transmits the plurality of detection signals (digital signals) $u_1, \ldots, u_6$ detected by the multi-axis sensor 18a of its own system (first system) S1 to the computation unit 20b of the other system (second system) S2. Further, the computation unit 20b transmits the plurality of detection signals (digital signals) $v_1, \ldots, v_6$ detected by the multi-axis sensor 18b of its own system (second system) S2 to the computation unit 20a of the other system (first system) S1.

On the basis of the plurality of detection signals $u_1, \ldots, u_6$ detected by the multi-axis sensor 18a of its own system (first system) S1, and the plurality of detection signals $v_1, \ldots, v_6$ detected by the multi-axis sensor 18b of the other system (second system) S2, the computation unit 20a further calculates values (hereinafter also referred to as second values) of the forces and moments of the predetermined plurality (N=6) of axial directions, which are applied to the detection target. Similarly, on the basis of the plurality of detection signals $v_1, \ldots, v_6$ detected by the multi-axis sensor 18b of its own system (second system) S2, and the plurality of detection signals $u_1, \ldots, u_6$ detected by the multi-axis sensor 18a of the other system (first system) S1, the computation unit 20b further calculates the second values (N=6). In this instance, $f^W_1, \ldots, f^W_6$ are taken to represent the plurality of second values calculated by each of the computation unit 20a and the computation unit 20b. Assuming that the plurality (N=6) of second values $f^W_1, \ldots, f^W_6$ are represented by a six (=N) dimensional vector $F^W$, the vector $F^W$ can be expressed by the following equation (14).

$$F^W=[f_1^W, \ldots, f_N^W]^T=[f_1^W,f_2^W,F_3^W,f_4^W,f_5^W,f_6^W]^T \quad (14)$$

According to the present embodiment, $f^W_1$ indicates a force in the X-axis direction, $f^W_2$ indicates a force in the Y-axis direction, and $f^W_3$ indicates a force in the Z-axis direction. Further, $f^W_4$ indicates a moment around the X-axis, $f^W_5$ indicates a moment around the Y-axis, and $f^W_6$ indicates a moment around the Z-axis.

In this instance, assuming that the plurality (N=6) of detection signals (digital signals) $u_1, \ldots, u_6$ detected by the multi-axis sensor 18a and the plurality (N=6) of detection signals (digital signals) $v_1, \ldots, v_6$ detected by the multi-axis sensor 18b are represented by a twelve (=2·N) dimensional vector W, the following equation (15) is obtained.

$$W=[u_1,u_2,u_3,u_4,u_5,u_6,v_1,v_2,v_3,v_4,v_5,v_6]^T \quad (15)$$

If the plurality of parameters (second conversion characteristic information) $c^W$ for obtaining the vector $F^W$ from the vector W are expressed in the form of an N×(2·N) matrix (conversion matrix) $C^W$ as indicated by the following equation (16), $F^W$, $C^W$, and W can be represented by a relational expression (model function) as indicated by the following equation (17). In this case as well, it is assumed that N=6.

$$C^W = \begin{bmatrix} C^W_{1,1} & \cdots & C^W_{1,2\cdot N} \\ \vdots & \ddots & \vdots \\ C^W_{N,1} & \cdots & C^W_{N,2\cdot N} \end{bmatrix} = \begin{bmatrix} C^W_{1,1} & \cdots & C^W_{1,12} \\ \vdots & \ddots & \vdots \\ C^W_{6,1} & \cdots & C^W_{6,12} \end{bmatrix} \quad (16)$$

$$F^W = C^W \cdot W \quad (17)$$

Accordingly, by using equations (14) to (17), each of the computation unit 20a and the computation unit 20b is capable of determining the plurality of second values $f^W_1, \ldots, f^W_6$ on the basis of the plurality of detection signals (digital signals) $u_1, \ldots, u_6$ detected by the multi-axis sensor 18a (plurality of sensor elements 12a), and the plurality of detection signals (digital signals) $v_1, \ldots, v_6$ detected by the multi-axis sensor 18b (plurality of sensor elements 12b). The plurality of parameters $c^W$ of the matrix $C^W$ are stored in the storage medium (second storage medium) 26 of the computation unit 20 of each of the systems S. In this case as well, in order to distinguish the storage media 26 of the two systems S from each other, the storage medium 26 of the first system S1 is denoted by 26a, whereas the storage medium 26 of the second system S2 is denoted by 26b.

The respective parameters $c^U$, $c^V$, $c^W$ of the matrices $C^U$, $C^V$, $C^W$ may be determined by minimization of a squared error (least square method), as was described in the background art of the present specification, or may be determined by another method. In essence, the respective parameters $c^U$, $c^V$, $c^W$ may be determined in such a manner that any errors between the external force and moment applied to the detection target, and the external force and moment calculated at that time based on the detection signals detected by the sensor elements 12 are minimized.

In this manner, the respective parameters $c^W$ of the matrix $C^W$ are determined such that errors are minimized, and by determining the second values $f^W_1, \ldots f^W_6$ using equations (14) to (17), it is possible to reduce any errors between the actually applied external forces and moments, and the forces and moments detected on the basis of the detection values detected by the sensor elements. More specifically, it is possible to suppress errors in comparison with the first values $f^U_1, \ldots, f^U_6$, the first values $f^V_1, \ldots, f^V_6$, or the average values of the first values $f^U_1, \ldots, f^U_6$ and the first values $f^V_1, \ldots, f^V_6$.

For this reason, at least one of the control unit 16a (computation unit 20a) and the control unit 16b (computation unit 20b) transmits the calculated plurality of second values $f^W_1, \ldots, f^W_6$ to an external device. The control unit 16a and the control unit 16b are capable of communicating with the external device wirelessly or over wires. The external device performs a predetermined control (for example, to control a robot or the like) on the basis of the plurality of second values $f^W_1, \ldots, f^W_6$ transmitted thereto.

In the case that an average is taken of the values of the first values $f^U_1, \ldots, f^U_6$ and the first values $f^V_1, \ldots, f^V_6$, the average value thereof can be expressed by the following equation (18). As shown in equation (18), these model functions (relational expressions) are included within a range of the model function (relational expression) shown in equation (17), however, since the respective parameters of the matrix (conversion matrix) $C^{UV}$ are not determined in such a manner to minimize errors therein, the errors in the case of using equation (18) are greater in comparison with the case of using equation (17).

$$\frac{(F^U + F^V)}{2} = \frac{C^U \cdot U + C^V \cdot V}{2} \quad (18)$$

$$= \left(\frac{C^U}{2}\right) \cdot U + \left(\frac{C^V}{2}\right) \cdot V$$

$$= \begin{bmatrix} \frac{C^U_{1,1}}{2} & \cdots & \frac{C^U_{1,6}}{2} & \frac{C^V_{1,1}}{2} & \cdots & \frac{C^V_{1,6}}{2} \\ \vdots & \ddots & \vdots & \vdots & \ddots & \vdots \\ \frac{C^U_{6,1}}{2} & \cdots & \frac{C^U_{6,6}}{2} & \frac{C^V_{6,1}}{2} & \cdots & \frac{C^V_{6,6}}{2} \end{bmatrix} \cdot W$$

$$= C^{UV} \cdot W$$

The abnormality determining unit 22 (22a, 22b) of each of the systems S (S1, S2) compares the plurality of first values $f^U_1, \ldots, f^U_6$ that were transmitted from the computation unit 20a of the first system S1 respectively with the plurality of first values $f^V_1, \ldots, f^V_6$ that were transmitted from the computation unit 20b of the second system S2, and determines (the absolute value of) the differences $|f^U_1 - f^V_1|, \ldots, |f^U_6 - f^V_6|$ between such values, respectively. These differences are obtained by comparing the first values having the same axial direction with each other, and obtaining (the absolute value of) the difference between such values. In addition, the abnormality determining unit 22 (22a, 22b) of each of the systems S determines whether or not at least one of the calculated differences $|f^U_1 - f^V_1|, \ldots, |f^U_6 - f^V_6|$ is greater than or equal to a predetermined amount, and if the difference is determined to be greater than or equal to the predetermined amount, it is determined that there is some kind of abnormality in the sensor device 10. It may also be determined whether or not the square of the difference is greater than or equal to a predetermined amount, and if the square of the difference is greater than or equal to the predetermined amount, then the existence of an abnormality may be determined.

When at least one of the abnormality determining unit 22a (control unit 16a) of the first system S1 and the abnormality determining unit 22b (control unit 16b) of the second system S2 determines the existence of an abnormality, a signal indicative of the abnormality is transmitted therefrom to the external device. When the signal indicative of the abnormality is transmitted thereto, the external device notifies the operator that there is an abnormality in the sensor device 10. As methods of providing such a notification, the existence of an abnormality in the sensor device 10 may be displayed on a display unit (not shown) such as a liquid crystal display or the like, or a warning sound may be output from a speaker (not shown).

MODIFICATIONS

The embodiment described above may be modified in the following ways.

Figure 2:
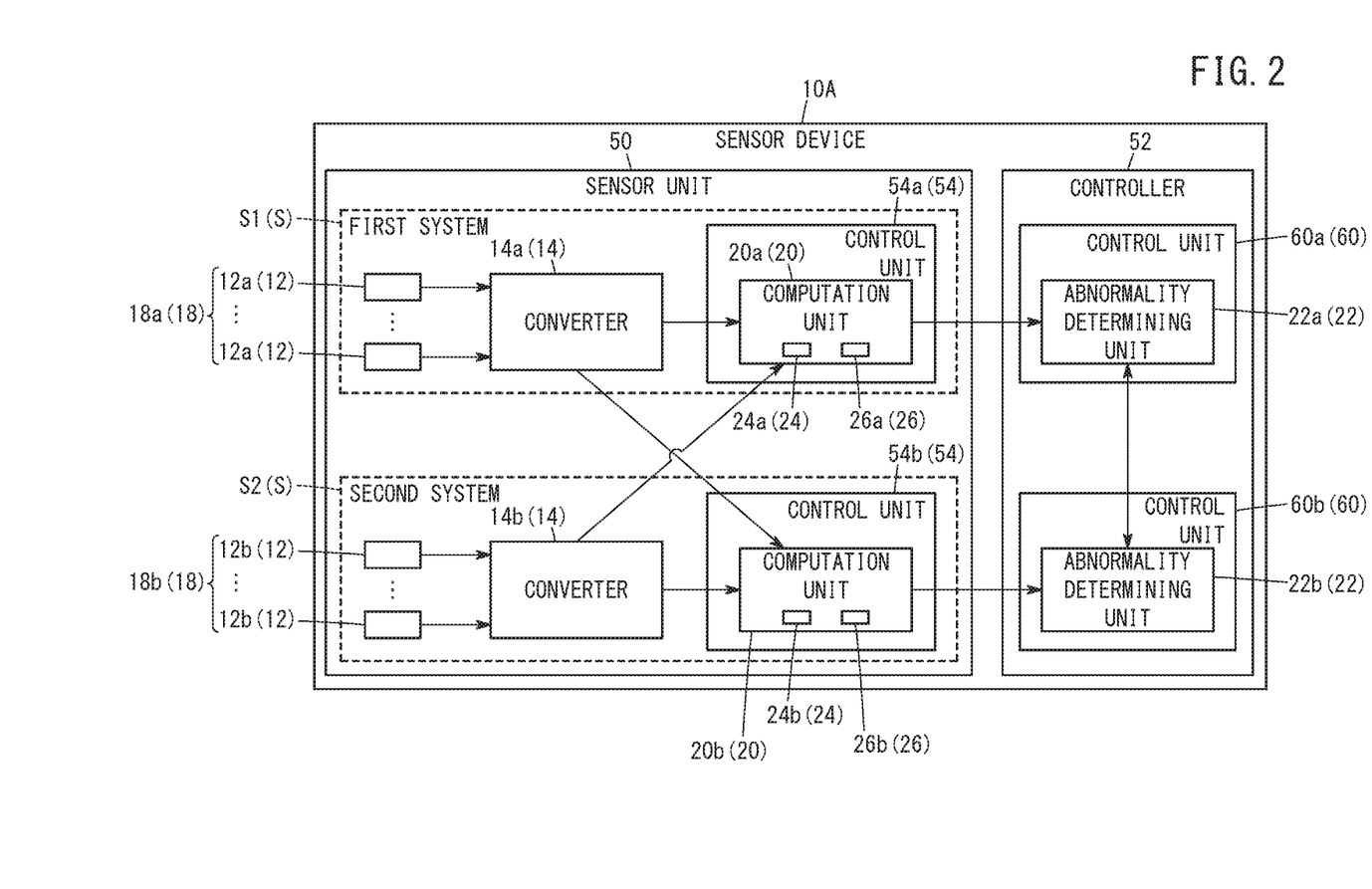
FIG. 2 is a view showing a configuration of a sensor device according to a first modification (Modification 1) of the embodiment.

(Modification 1) FIG. 2 is a view showing a configuration of a sensor device 10A according to a first modification, referred to below as Modification 1. Components or functions which are the same as those of the above-described embodiment are denoted by the same reference numerals, and only portions thereof that differ will be described.

The sensor device 10A comprises a sensor unit 50 and a controller 52. The sensor unit 50 is equipped with two systems S each having a plurality (N=6) of sensor elements 12, a converter 14, and a control unit 54. In Modification 1 as well, in order to distinguish between the constituent components (including functions thereof) corresponding to the first system S1 and the constituent components (including functions thereof) corresponding to the second system S2, descriptions are made in which constituent elements of the first system S1 are denoted with the suffix "a" appended to the reference numerals therefor, and constituent elements of the second system S2 are denoted with the suffix "b" appended to the reference numerals therefor. Accordingly, for example, there are cases in which the sensor elements 12, the converter 14, and the control unit 54 of the first system S1 are denoted by 12a, 14a, and 54a, and the sensor elements 12, the converter 14, and the control unit 54 of the second system S2 are denoted by 12b, 14b, and 54b. A plurality (N=6) of sensor elements 12a make up a multi-axis sensor 18a (18) of the first system S1, and a plurality (N=6) of sensor elements 12b make up a multi-axis sensor 18b (18) of the second system S2.

Each of the control units 54 (54a, 54b) of the respective systems S (S1, S2) includes a processor such as a CPU or the like, and a storage medium in which a program is stored, and by the processors executing the programs, the processors function as the control units 54 (54a, 54b) according to the present Modification 1. The control units 54 (54a, 54b) include respective computation units 20 (20a, 20b).

In Modification 1, the converter 14a outputs the plurality of detection signals (digital signals) $u_1, \ldots, u_6$ detected by the multi-axis sensor 18a (plurality of sensor elements 12a) to the computation unit 20a of its own system (first system) S1, and together therewith, outputs the detection signals $u_1, \ldots, u_6$ to the computation unit 20b of the other system (second system) S2. More specifically, the converter 14a is connected electrically through a connection line with the computation unit 20a, and is connected electrically through a connection line with the computation unit 20b.

Further, the converter 14b outputs the plurality of detection signals (digital signals) $v_1, \ldots, v_6$ detected by the multi-axis sensor 18b (plurality of sensor elements 12b) to the computation unit 20b of its own system (second system) S2, and together therewith, outputs the detection signals $v_1, \ldots, v_6$ to the computation unit 20a of the other system (first system) S1. More specifically, the converter 14b is connected electrically through a connection line with the computation unit 20b, and is connected electrically through a connection line with the computation unit 20a.

As was noted in relation to the above-described embodiment, the computation unit 20a calculates the plurality of first values $f^U_1, \ldots, f^U_6$ on the basis of the plurality of detection signals $u_1, \ldots, u_6$, and together therewith, calculates the plurality of second values $f^W_1, \ldots, f^W_6$ on the basis of the plurality of detection signals $u_1, \ldots, u_6$ and the plurality of detection signals $v_1, \ldots, v_6$. The computation unit 20b calculates the plurality of first values $f^V_1, \ldots, f^V_6$ on the basis of the plurality of detection signals $v_1, \ldots, v_6$, and together therewith, calculates the plurality of second values $f^W_1, \ldots, f^W_6$ on the basis of the plurality of detection signals $v_1, \ldots, v_6$ and the plurality of detection signals $u_1, \ldots, u_6$.

At least one of the computation unit 20a (control unit 54a) and the computation unit 20b (control unit 54b) transmits the calculated plurality of second values $f^W_1, \ldots, f^W_6$ to an external device. The control unit 54a and the control unit 54b are capable of communicating with the external device wirelessly or over wires. The external device performs a predetermined control (for example, to control a robot or the like) on the basis of the plurality of second values $f^W_1, \ldots, f^W_6$ transmitted thereto. Moreover, the computation units 20a, 20b (control units 54a, 54b) may transmit the plurality of second values $f^W_1, \ldots, f^W_6$ to the external device through the controller 52.

The controller 52 is equipped with two control units 60 (60a, 60b) corresponding to the two systems S (S1, S2). Each of the two control units 60 (60a, 60b) includes a processor such as a CPU or the like, and a storage medium in which a program is stored, and by the processors executing the programs, the processors function as the control units 60 (60a, 60b) according to the present Modification 1. The control units 60 (60a, 60b) include respective abnormality determining units 22 (22a, 22b).

The computation unit 20a (control unit 54a) and the abnormality determining unit 22a (control unit 60a) are capable of communicating mutually with each other wirelessly or over wires, and the computation unit 20b (control unit 54b) and the abnormality determining unit 22b (control unit 60b) are capable of communicating mutually with each other wirelessly or over wires. Further, the abnormality determining unit 22a (control unit 60a) and the abnormality determining unit 22b (control unit 60b) are capable of communicating mutually with each other wirelessly or over wires.

The computation unit 20a (control unit 54a) transmits the calculated plurality of first values $f^U_1, \ldots, f^U_6$ to the abnormality determining unit 22a (control unit 60a). The abnormality determining unit 22a (control unit 60a) transmits the plurality of first values $f^U_1, \ldots, f^U_6$, which were transmitted thereto from the computation unit 20a (control unit 54a), to the abnormality determining unit 22b (control unit 60b). The computation unit 20b (control unit 54b) transmits the calculated plurality of first values $f^V_1, \ldots, f^V_6$ to the abnormality determining unit 22b (control unit 60b). The abnormality determining unit 22b (control unit 60b) transmits the plurality of first values $f^V_1, \ldots, f^V_6$, which were transmitted thereto from the computation unit 20b (control unit 54b), to the abnormality determining unit 22a (control unit 60a).

Each of the abnormality determining unit 22a and the abnormality determining unit 22b compares the plurality of first values $f^U_1, \ldots, f^U_6$ respectively with the plurality of first values $f^V_1, \ldots, f^V_6$, and determines (the absolute values of) the differences $|f^U_1 - f^V_1|, \ldots, |f^U_6 - f^V_6|$ between such values, respectively. In addition, the abnormality determining unit 22a and the abnormality determining unit 22b determine whether or not at least one of the respectively calculated differences $|f^U_1 - f^V_1|, \ldots, |f^U_6 - f^V_6|$ is greater than or equal to a predetermined amount, and if the difference is determined to be greater than or equal to the predetermined amount, it is determined that there is some kind of abnormality in the sensor device 10A. It may also be determined whether or not the square of the difference is greater than or equal to a predetermined amount, and if the square of the difference is greater than or equal to the predetermined amount, then the existence of an abnormality may be determined.

When at least one of the abnormality determining unit 22a (control unit 60a) of the first system S1 and the abnormality determining unit 22b (control unit 60b) of the second system S2 determines the existence of an abnormality, a signal indicative of the abnormality is transmitted therefrom to the external device. When the signal indicative of the abnormality is transmitted thereto, the external device notifies the operator that there is an abnormality in the sensor device 10A. As methods of providing such a notification, the existence of an abnormality in the sensor device 10A may be displayed on a display unit (not shown) such as a liquid crystal display or the like, or a warning sound may be output from a speaker (not shown).

(Modification 2) According to the above-described embodiment and Modification 1, the computation unit 20a of the first system S1 and the computation unit 20b of the second system S2 both calculate the second values $f^W_1, \ldots, f^W_6$. However, only one of the computation units 20a or 20b may be used to calculate the second values $f^W_1, \ldots, f^W_6$. Further, the abnormality determining unit 22a of the first system S1 and the abnormality determining unit 22b of the second system S2 both determine whether or not there is an abnormality. However, only one of the abnormality determining units 22a, 22b may determine the presence or absence of an abnormality.

(Modification 3) According to the above-described embodiment, the abnormality determining units 22 are provided corresponding respectively to the systems S. However, the abnormality determining unit 22 may be provided in only one of the systems S. Further, according to the above-described Modification 1, two control units 60a, 60b (abnormality determining units 22a, 22b) are provided in the controller 52 corresponding respectively to the systems S. However, only one control unit 60 (one abnormality determining unit 22) may be provided in the controller 52. In this case, the computation units 20a, 20b both transmit the calculated first values $f^U_1, \ldots, f^U_6, f^V_1, \ldots, f^V_6$ to the one control unit 60 (abnormality determining unit 22).

(Modification 4) The sensor devices 10, 10A may include three or more systems S.

(Modification 5) The number of sensor elements 12 in each of the systems S of the sensor devices 10, 10A may be one. Further, the computation units 20 of the sensor devices 10, 10A need not determine forces and moments in a plurality of axial directions, but may determine a force or a moment in one predetermined axial direction.

(Modification 6) The computation units 20 of the sensor devices 10, 10A may determine only one of a force and a moment.

(Modification 7) The aforementioned Modifications 1 to 6 may be arbitrarily combined in various ways, insofar as no inconsistencies occur in the resultant combinations.

As has been described above, the sensor devices 10, 10A which have been described in connection with any of the above-described embodiment and Modifications 1 to 3 are each equipped with a plurality of systems S each having sensor elements 12 configured to detect at least one of an external force and a moment applied to a detection target, and a computation unit 20 configured to calculate as a first value a value of at least one of a force and a moment applied to the detection target in a predetermined axial direction, based on a detection signal detected by the sensor elements 12, and an abnormality determining unit 22 configured to compare the first values calculated by the respective computation units 20 of the plurality of systems S, and determine that there is an abnormality if a difference between the first values is greater than or equal to a predetermined amount. The computation unit 20 of at least one system S of the plurality of systems S calculates as a second value a value of at least one of a force and a moment applied to the detection target in a predetermined axial direction, based on a plurality of detection signals detected by the respective sensor elements 12 of the plurality of systems S.

In accordance with the above configuration, the computation unit 20 calculates as a second value at least one of a force and a moment applied to the detection target in an axial direction, based on detection signals detected by the sensor elements 12 of the plurality of systems S, and therefore, the detection accuracy of the sensor devices 10, 10A is improved. Stated otherwise, it is possible to reduce errors between actually applied external forces and moments, and forces and moments determined based on detection signals detected by the sensor elements 12. Further, the abnormality determining unit 22 compares the first values calculated by the respective systems S, and determines that there is an abnormality if the difference between the first values is greater than or equal to a predetermined amount. Therefore, it is possible to determine with high accuracy whether or not the sensor device 10, 10A is operating normally.

Each of the plurality of systems S may include a plurality of sensor elements 12, and each of the computation units 20 of the plurality of systems S may calculate values of at least one of forces and moments in a predetermined plurality of axial directions. In accordance with this feature, the computation units 20 can obtain the first values and the second values in a plurality of axial directions. Accordingly, the sensor devices 10, 10A are capable of detecting at least one of forces and moments in a plurality of axial directions.

Each of the computation units 20 of the plurality of systems S includes the storage medium 24 in which there are stored the parameters c (first conversion characteristic information) for converting the detection signal detected by the sensor elements 12 of its own system S into first values. The computation unit 20 of at least one system S of the plurality of systems S further includes the storage medium 26 in which there are stored the parameters c (second conversion characteristic information) for converting the detection signals detected by the sensor elements 12 of each of the plurality of systems S into second values. In accordance with this feature, the computation units 20 can calculate the first values and the second values with high accuracy.

The respective computation units 20 of the plurality of systems S are capable of communicating mutually with each other, and receive from the computation unit 20 of another system S the detection signals detected by the sensor elements 12 of the other system S. In accordance with this feature, the computation units 20 of the respective systems S are each capable of acquiring the detection signals detected by the sensor elements 12 of the other system S, and using them to calculate the second values.

Each of the plurality of systems S may include a converter 14 configured to convert the detection signals detected by the sensor elements 12 into digital signals, and each of the converters 14 of the plurality of systems S may output to the computation units 20 of the plurality of systems S the detection signals that were converted into digital signals. In accordance with this feature, the computation units 20 of the respective systems S are each capable of acquiring the detection signals detected by the sensor elements 12 of the other system S, and using them to calculate the second values.

The abnormality determining units 22 may be provided corresponding respectively to the plurality of systems S. In accordance with this feature, it is possible to determine whether or not the sensor device 10, 10A is operating normally for each of the systems S.

While the invention has been particularly shown and described with reference to a preferred embodiment, it will be understood that variations and modifications can be effected thereto by those skilled in the art without departing from the scope of the invention as defined by the appended claims.

What is claimed is:

1. A sensor device comprising:

a plurality of systems each having a sensor element configured to detect at least one of an external force and a moment applied to a detection target, and a computation unit configured to calculate as a first value a value of at least one of a force and a moment applied to the detection target in a predetermined axial direction, based on a detection signal detected by the sensor element; and an abnormality determining unit configured to compare the first value calculated by the computation unit of each of the plurality of systems with one another, thereby obtaining at least one of a difference between external forces detected in each of the plurality of systems and a difference between moments detected in each of the plurality of systems, and to determine that there is an abnormality if at least one of the difference between the external forces and the difference between the moments is greater than or equal to a predetermined amount, wherein the computation unit of at least one system of the plurality of systems calculates as a second value a value of at least one of a force and a moment applied to the detection target in the axial direction, based on a plurality of detection signals detected by the respective sensor elements of all of the plurality of systems, the computation unit of each of the plurality of systems is capable of communicating mutually with each other, and receives from the computation unit of another one of the plurality of systems the detection signal detected by the sensor element of the other system.

2. The sensor device according to claim 1, wherein the abnormality determining unit comprises a plurality of abnormality determining units which are provided corresponding respectively to the plurality of systems.

3. The sensor device according to claim 1, wherein:

each of the plurality of systems includes a plurality of sensor elements; and the computation unit of each of the plurality of systems calculates values of at least one of a force and a moment in a plurality of axial directions.

4. The sensor device according to claim 1, wherein:

the computation unit of each of the plurality of systems includes a first storage medium in which there is stored first conversion characteristic information for converting the detection signal detected by the sensor element of its own system into the first value; and the computation unit of at least one system of the plurality of systems further includes a second storage medium in which there is stored second conversion characteristic information for converting the detection signals detected by the respective sensor elements of the plurality of systems into the second value.

5. The sensor device according to claim 1, wherein:

each of the plurality of systems includes a converter configured to convert the detection signal detected by the sensor element into a digital signal; and the converter of each of the plurality of systems outputs the detection signal that was converted into a digital signal, to the computation units of the plurality of systems.

6. A sensor device comprising:

a plurality of systems each having a sensor element configured to detect at least one of an external force and a moment applied to a detection target, and a computation unit configured to calculate as a first value a value of at least one of a force and a moment applied to the detection target in a predetermined axial direction, based on a detection signal detected by the sensor element; and an abnormality determining unit configured to compare the first value calculated by the computation unit of each of the plurality of systems with one another, thereby obtaining at least one of a difference between external forces detected in each of the plurality of systems and a difference between moments detected in each of the plurality of systems, and to determine that there is an abnormality if at least one of the difference between the external forces and the difference between the moments is greater than or equal to a predetermined amount, wherein the computation unit of at least one system of the plurality of systems calculates as a second value a value of at least one of a force and a moment applied to the detection target in the axial direction, based on a plurality of detection signals detected by the respective sensor elements of all of the plurality of systems, the abnormality determining unit comprises a plurality of abnormality determining units which are provided corresponding respectively to the plurality of systems.

7. The sensor device according to claim 6, wherein:

each of the plurality of systems includes a plurality of sensor elements; and the computation unit of each of the plurality of systems calculates values of at least one of a force and a moment in a plurality of axial directions.

8. The sensor device according to claim 6, wherein:

the computation unit of each of the plurality of systems includes a first storage medium in which there is stored first conversion characteristic information for converting the detection signal detected by the sensor element of its own system into the first value; and the computation unit of at least one system of the plurality of systems further includes a second storage medium in which there is stored second conversion characteristic information for converting the detection signals detected by the respective sensor elements of the plurality of systems into the second value.

9. The sensor device according to claim 6, wherein:

each of the plurality of systems includes a converter configured to convert the detection signal detected by the sensor element into a digital signal; and the converter of each of the plurality of systems outputs the detection signal that was converted into a digital signal, to the computation units of the plurality of systems.

* * * * *